No. 793,142. Patented June 27, 1905.

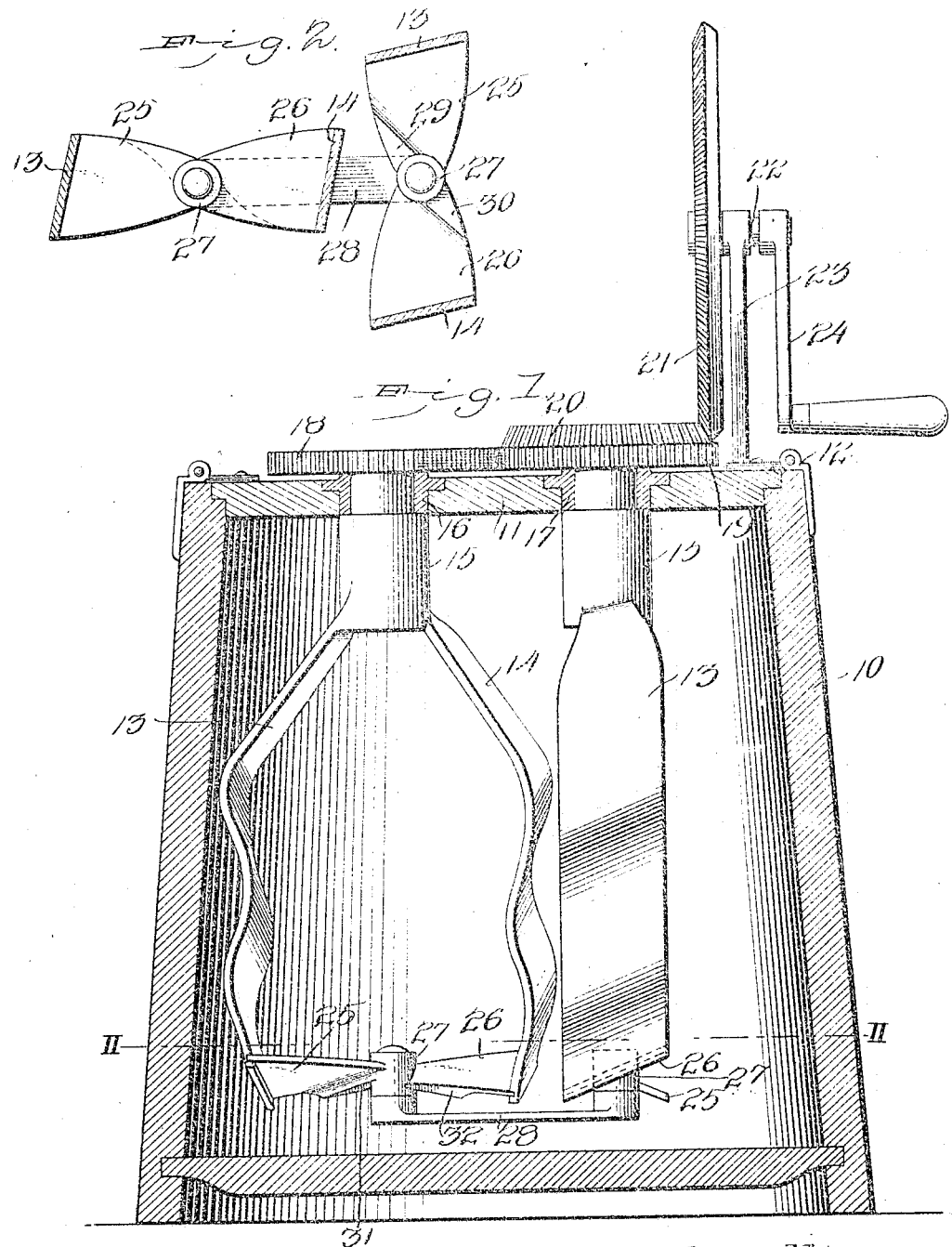

UNITED STATES PATENT OFFICE.

JAMES R. MERRELL, OF CHELSEA, INDIAN TERRITORY.

CHURN-DASHER.

SPECIFICATION forming part of Letters Patent No. 793,142, dated June 27, 1905.

Application filed March 9, 1904. Serial No. 197,311.

*To all whom it may concern:*

Be it known that I, JAMES R. MERRELL, a citizen of the United States, residing at Chelsea, in Cherokee Nation, Indian Territory, have invented a new and useful Churn-Dasher, of which the following is a specification.

This invention relates to churns, and has for its object the production of a device of this character in which the cream will be more thoroughly commingled and the particles of butter released in the minimum of time and with the expenditure of the minimum of force.

The invention consists in the construction and mode of operation of a double dasher formed of reversely-disposed oppositely-rotating members consisting of reversely-disposed side plates inclined tangentially to the axial lines and with a plurality of reversed longitudinally-disposed curves and transverse connecting-bars reversely inclined at their opposite ends.

The invention further consists in certain novel features of the construction, all as hereinafter shown and described, and specified in the claims.

In the drawings illustrative of the invention, Figure 1 is a vertical sectional elevation. Fig. 2 is a transverse section of the double-dasher member on the line II II of Fig. 1.

The improved dasher may be attached to any of the usual forms of churn-casings or cream-receptacles, and I do not wish, therefore, to be limited to any specific form of receptacle, and reserve the right to apply the invention to any style or form of cream-receptacle to which it is adapted.

For the purpose of illustration the invention is shown applied to a conventional form of receptacle (indicated at 10) and provided with a detachable cover, to which the dasher mechanism is attached, the cover being preferably removably connected, as at 12, so that when the cover is removed the dasher member will be removed with it. While this may be the preferred means for securing the cover and mounting the dasher mechanism, I do not wish to be limited thereto, as this portion of the device may be modified as circumstances may require.

The improved dasher is formed in two independent dasher members, and as these dasher members are similar in construction corresponding characters will be employed to designate like parts in each. Each of the dasher members consists of spaced side plates 13 14, united at one end, as by a hub 15, the side plates being correspondingly inclined transversely and tangentially of the axial line and formed with a plurality of reversed longitudinally-disposed curves, the lines of the curves being likewise inclined with reference to the longitudinal axial lines, with the inclination of the side plate 13 reversely to that of the side plate 14, as shown. It will also be noted that both the tangential inclinations of the side plates and the inclinations of the reversed curves or corrugations of the right-hand dasher member side plates are in reverse order to the corresponding parts in the left-hand dasher member, the object to be hereinafter explained.

The spaced side members 13 14 are connected at their lower ends by transverse blades formed somewhat like small screw-propellers with two flukes (indicated at 25 26) reversely inclined in the usual manner and each opposite pair merging into a central hub 27, as shown.

The hubs of the opposite parts 25 26 of the two dasher members are connected by a transverse tie-bar 28, the latter forming a connection between the lower ends of the dasher members centrally, so that while preventing them from relative lateral movement the tie-bar will not interfere with the rotative movement.

The reversely-inclined connecting members 25 26 are provided on the upper surface of the blades of the right-hand dasher member with oppositely-radiating curved projections or corrugations 29 30, while corresponding projections or corrugations 31 32 are formed upon the opposite connecting member at its lower side, the object to be hereinafter explained.

The hubs 15 will be rotatively supported in the cover 11, preferably in bushings 16 17, to prevent undue wear of the parts and will be provided with intermeshing gears 18 19, as shown, so that the two hubs and the dasher members carried thereby will be rotated in opposite directions when motion is imparted to the gears.

One of the gears 18 or 19, as may be preferred, will be provided with means whereby it may be rotated, and for illustration the gear 19 is shown provided with this means, consisting in a bevel-gear rim 20, adapted to be engaged by a corresponding bevel-gear 21, preferably of larger diameter, mounted upon a shaft 22, supported rotatively in a bracket 23 and provided with an operating-handle 24, the bracket 23 supported upon the cover 11, as shown, so that when the cover is elevated the whole dasher mechanism and its operative means will be elevated together and the dashers thereby removed from the cream-receptacle. The gear 19 and its hub 15 will be so disposed that the dasher member carried thereby will be at right angles to the dasher member supported from the gear 18, so that when the dasher members are revolved the side plates of one member will come opposite the space between the side plates of the other member, as indicated in Fig. 1. By this means the two dasher members will constantly interengage, but will not interfere, the object to be hereinafter more fully explained. From this arrangement it will be obvious when the handle member is revolved the dasher members will be correspondingly revolved in opposite directions and at a higher speed owing to the larger size of the gear 21.

When thus constructed and installed, the operation is as follows: Motion being imparted to the dasher members, as above noted, the reversely-inclined and longitudinally-corrugated side bars 13 14 of the right-hand dasher member will serve to draw the cream longitudinally in one direction, while the opposite dasher member, being reversely curved and inclined, will serve to draw the cream in the opposite direction, so that the cream will be constantly moved upward and downward within the cream-receptacle at the same time that it is agitated by the rotary motion of the parts, thus thoroughly commingling the particles of the cream and separating the butter therefrom. If the handle member be turned to the right, the right-hand dasher member will be turned to the left and the left-hand dasher member to the right, as will be obvious, and when thus operated the right-hand dasher member will elevate the cream, while the left-hand dasher member will move it downward, thus keeping it in constant motion longitudinally of the cream-receptacle, while at the same time thoroughly agitating and commingling the particles laterally, as before noted. The connecting-blades 25 26 also serve an important function in this respect, as they likewise exert a vertically-moving force upon the cream, one drawing it upward from the bottom of the cream-receptacle and the other moving it downward toward the bottom, thus materially aiding in the separating action. The corrugations or projections 29 30 31 32 are also an important feature of the construction, as they produce a lateral agitation upon the cream particles and assist the reversely-curved portions 25 26 in their action.

The independent dasher members may be constructed in any desired size, according to the capacity of the receptacle 10, and may be therefore adapted to any size of churn from the smallest hand-operated churns to the largest power-operated churns. The proportions of the parts may be varied to any required extent to adapt the churn to the work required. The side plates 13 14 may be formed separately from the lower cross connections 25 26 27 or integral therewith, as may be preferred. The dasher members will be of metal and will preferably be tinned, galvanized, or otherwise coated to prevent deleterious action upon the cream, and all the other metal parts which come in contact with the cream will be likewise protected.

The sizes of the corrugations in the spaced side plates and the number employed, as well as the degree of transverse inclination thereof, may be varied to any required extent or as circumstances may determine without affecting the principle of the invention or sacrificing any of its advantages.

Having thus described the invention, what is claimed is—

1. A churn-dasher comprising two reversely-rotatable dasher members, each dasher member having a propeller-wheel made up of a hub and two radial blades and substantially parallel side bars rising from the outer ends of the blades with their upper ends converged, the parallel portions of the side bars being set obliquely at corresponding angles to radii and convolute in form, the side bars of one dasher member being disposed reversely to those of the other dasher member, a hub connecting the upper ends of the side bars of each dasher member, and a tie-bar connecting the lower ends of the hubs, the distance between the hubs being less than the width of either dasher member, and said members being set at substantially right angles to one another, whereby the opposite side bars of the dasher members work successively in the space between the axes of the members.

2. A churn-dasher comprising a pair of radial propeller-blades, side members rising from the ends of the propeller-blades in substantial parallelism with their upper ends converged, said side members being set obliquely at corresponding angles to radii and convolute in form, and a journal connecting the upper ends of the side members of the dasher.

In testimony that I claim the foregoing as my own I have hereto affixed my signature in the presence of two witnesses.

JAMES R. MERRELL.

Witnesses:
  B. H. HESTER,
  F. M. BRISCOE.